United States Patent

Mannschke

[11] Patent Number: 4,535,440
[45] Date of Patent: Aug. 13, 1985

[54] OPTICAL MULTIPLEXER

[75] Inventor: Lothar Mannschke, Eckental, Fed. Rep. of Germany

[73] Assignee: U.S. Philips Corporation, New York, N.Y.

[21] Appl. No.: 515,701

[22] Filed: Jul. 20, 1983

[30] Foreign Application Priority Data

Aug. 18, 1982 [DE] Fed. Rep. of Germany ....... 3230657

[51] Int. Cl.³ .............................................. H04B 9/00
[52] U.S. Cl. ..................... 370/1; 350/96.15; 455/612
[58] Field of Search ............... 370/1, 2; 455/610, 612; 350/96.15, 96.16, 96.14, 96.12, 96.17, 96.18, 96.19, 96.13

[56] References Cited

U.S. PATENT DOCUMENTS

| 4,070,094 | 1/1978 | Martin | 350/96 |
| 4,128,300 | 12/1978 | Stotts et al. | 350/96.14 |
| 4,165,225 | 8/1979 | Auracher et al. | 350/96.15 |
| 4,360,248 | 11/1982 | Bickel et al. | 350/96.15 |
| 4,384,038 | 5/1983 | Khoe et al. | 430/321 |
| 4,444,460 | 4/1984 | Stowe | 350/96.15 |

FOREIGN PATENT DOCUMENTS

| 2340020 | 2/1975 | Fed. Rep. of Germany . | |
| 2640422 | 3/1977 | Fed. Rep. of Germany . | |
| 2812346 | 9/1978 | Fed. Rep. of Germany | 350/96.15 |
| 1369010 | 6/1964 | France | 350/96.15 |
| 52-25655 | 2/1977 | Japan | 350/96.15 |
| 52-77740 | 6/1977 | Japan | 350/96.18 |
| 1486632 | 9/1977 | United Kingdom . | |
| 2102145 | 1/1983 | United Kingdom | 350/96.17 |

OTHER PUBLICATIONS

McMahon et al—"Device and System Concepts'-'—Conf. Electromag. Wave Propagation Panel/Avionic Panel Joint Symp. England, May 1971, pp. 17-1-10.
Stensland—"Integrated Optics"—Physics in Technology, vol. 9, pp. 108-114, May 1978.
Hoffman, D., et al. "Diffused Optical Waveguides on the +c and -c Force of c-Plate LiNbO₃—Characteristics Revealed by Chemical Etchings." *First European Conf. on Integrated Optics*, London, Sep. 14 and 15, 1981, pp. 1-3.

Primary Examiner—Joseph A. Orsino, Jr.
Attorney, Agent, or Firm—Marc D. Schechter

[57] ABSTRACT

Identical coupling conditions are achieved in an integrated optical component by pairs of branch tracks which successively intersect into a central track. Low attenuation values are achieved with angles of incidence of 1.5 degrees.

4 Claims, 3 Drawing Figures

OPTICAL MULTIPLEXER

BACKGROUND OF THE INVENTION

The invention relates to an optical multiplexer. The multiplexer is formed by branching, light-guiding tracks which are embedded in the surface of a solid body. Such tracks are used to form integrated optical components which perform a variety of tasks in the communication technology.

United Kingdom Pat. No. 1,486,632 discloses an integrated optical connector with branching for distributing radiation. When travelling in the opposite direction, radiation can also be recombined in such a branch. For multiplexing, however, this type of branching is not suitable because unequal coupling conditions exist for different tracks at the branching location.

SUMMARY OF THE INVENTION

It is an object of the invention to provide an integrated optical multiplexer having a number of branching locations. At all branching locations, the coupling losses are approximately equal and are as small as possible.

To this end, an optical multiplexer according to the invention includes a light-guiding central track on which successive branches are formed. At each branch location, branch tracks intersect the central track on both sides of the central track and at the same angle.

In a particularly attractive embodiment, the angles at which the branch tracks open into the central track are approximately 1.5°.

DESCRIPTION OF THE PREFERRED EMBODIMENTS

Figure 1:
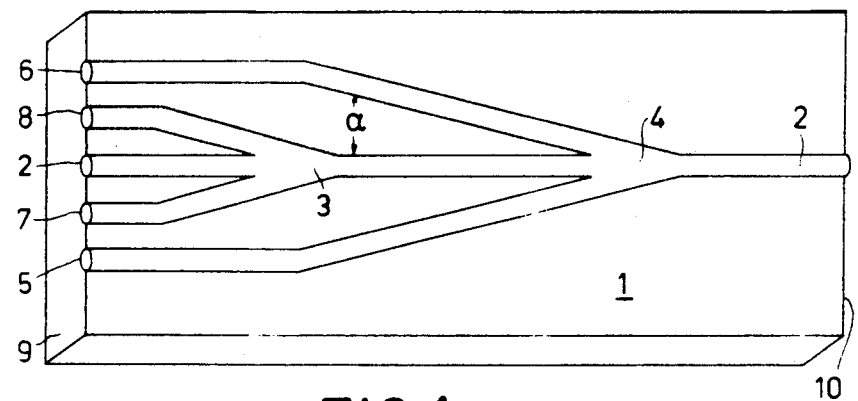
FIG. 1 is a perspective view of a five-channel multiplexer.

The optical multiplexer shown in FIG. 1 comprises a rectilinear central track 2 embedded in a solid body 1. Track 2 can be connected to an optical transmission system at both ends. On the central track 2 there are formed successive branches 3 and 4. At each branch pairs of branch tracks 5 and 6 and 7 and 8 intersect central track 2. The input sections of the branch tracks 5 to 8 are directed parallel to the central track 2 and terminate, together with the central track, on a side 9 of the solid body 1.

Solid bodies for integrated optical elements are made of, for example, borosilicate glass having a comparatively small refractive index. Using a mask, metal ions are implanted along desired tracks in order to modify the refractive index.

Another known manufacturing method is disclosed, for example, in an article entitled "Diffused Optical Waveguides on the +c and −c Face of c-plate LiNbO₃—Characteristics Revealed by Chemical Etching" by D. Hoffmann, et al (*First European Conference on Integrated Optics*", London, Sept. 14/15, 1981, pages 1 to 3. In this method the solid body is a substrate of $LiNbO_3$ in which the tracks are formed by titanium ion diffusion. Again masks are used for forming the track pattern according to the invention.

In the multiplexer shown in FIG. 1, radiation from four optical channels can be applied to the branch tracks 5 to 8 on the side 9 of a solid body. The multiplexed radiation then appears at the exit of the central track 2 on the opposite side 10 of body 1.

The properties of the multiplexer, notably the function of all connections, can be tested by measuring apparatus without interference from the radiation in the branch tracks. The measuring apparatus is connected to the central track 2 which extends between the two sides 9 and 10. If desired, the straight portion of the central track 2 may be used as a fifth channel.

Angles of incidence α of approximately 1.5 degrees between the branch tracks 5 to 8 and the central track 2 eliminate, for example, distrubances caused by one branch track on the other branch track connected to the same branch.

Figure 2:
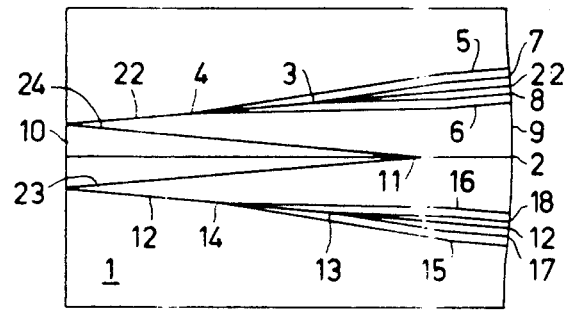
FIG. 2 is a schematic plan view of an eleven-channel multiplexer.

FIG. 2 shows a further version of a multiplexer. This version has a larger number of channels. In this multiplexer, the radiation is reflected on a side 10. Tracks 23 and 24 intersect a continuous central track 2 at the branch 11. These tracks 23 and 24 are continuations of the central tracks 12 and 22, respectively, after reflection.

Thus, a particularly compact construction is obtained. The lengthy device formed due to the small angle of incidence α is distributed over a larger surface.

In addition to ten channels 5, 6, 7, 8, 12, 15, 16, 17, 18, and 22 to be connected to the side 9, a further channel connection to the central track 2 is available. The branches of the tracks 12 and 22 are denoted by the reference numerals 3, 4, 13 and 14.

Figure 3:
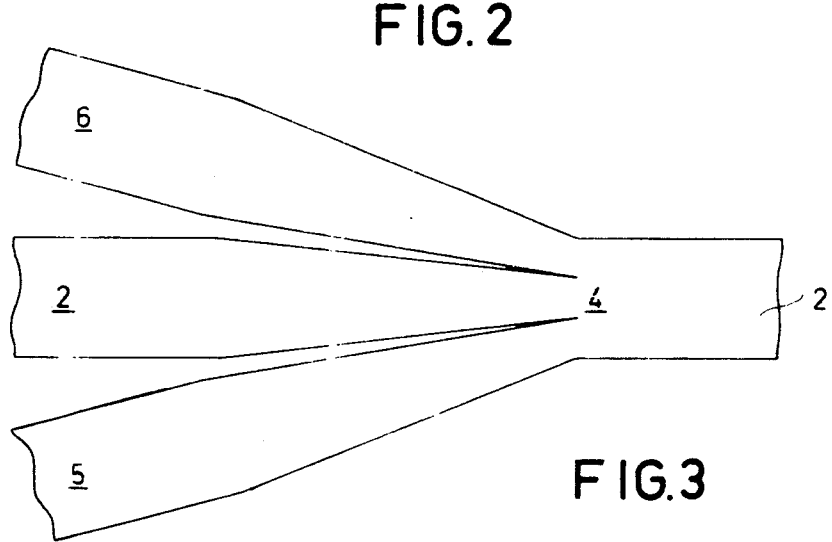
FIG. 3 is a plan view of one version of a branch.

An attractive branch is shown in FIG. 3. In this branch, all tracks 2, 5, and 6 become narrower toward the central track 2, so that their cross-sections are reduced at the area of the branch 4. The common point of intersection of their optical axes is situated within the central track.

The wedge-like shape of the tracks reduces energy losses caused by modes which could otherwise propagate at the area of the branch if the track had an increased diameter. Energy emerging at the area of the narrowed portion is partly captured again by modes which cannot propagate in but only outside this area. This is particularly advantageous for monomode systems.

When operating in the opposite direction, a multiplexer according to the invention can also be used as a branching device.

What is claimed is:

1. An optical multiplexer formed by branching light-guiding tracks which are embedded in the surface of a solid body, the improvement therein comprising a reflective side in said solid body, a light-guiding central track in said solid body, said central track being diverted symmetrically into at least two angled tracks connecting to said central track from opposite sides of said central track at a joining point along the length of said central track, said angled tracks extending to said reflective side of said solid body and turning back and extending to the opposite side of said body, said angled tracks having successive branches along their respective lengths, each branch including a pair of branch tracks opening from opposite sides into said respective angled track at the same angle, and at the same longitudinal position along said angled track, said branches being separated along the length of said respective angled tracks.

2. An optical multiplexer as claimed in claim 1, wherein the cross section of at least one of the angled track and said branch tracks is reduced at the area of the respective branch.

3. An optical multiplexer as claimed in claim 1, wherein the ends of each of said branch tracks proximate said opposite side are parallel to the associated angled track.

4. An optical multiplexer as claimed in claim 1, wherein said solid body is made of borosilicate glass.

* * * * *